A. V. MITCHELL.
SPRING WHEEL CONSTRUCTION.
APPLICATION FILED OCT. 17, 1913.
1,127,271.
Patented Feb. 2, 1915.
2 SHEETS—SHEET 2.
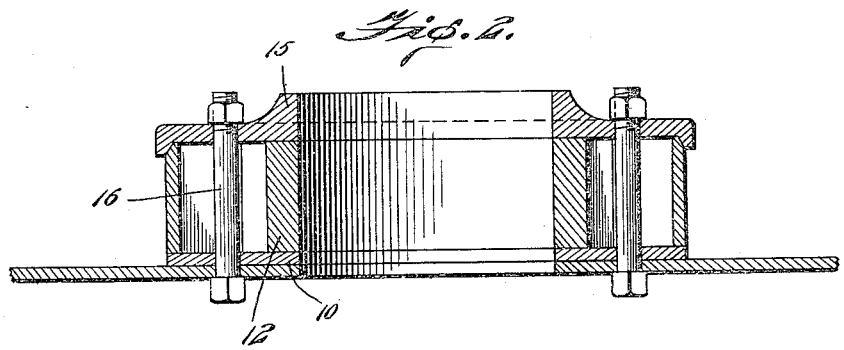
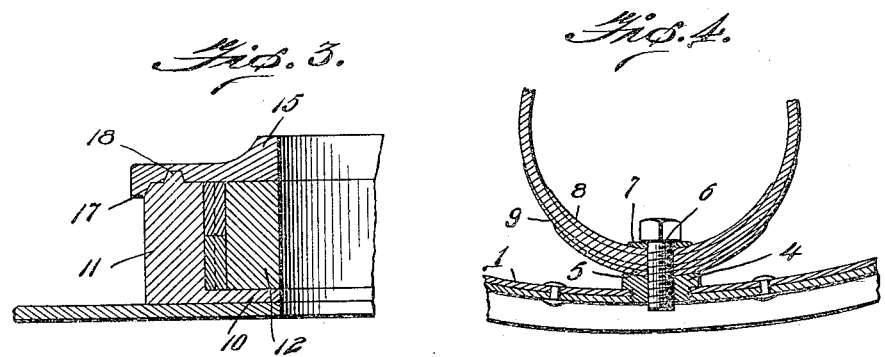
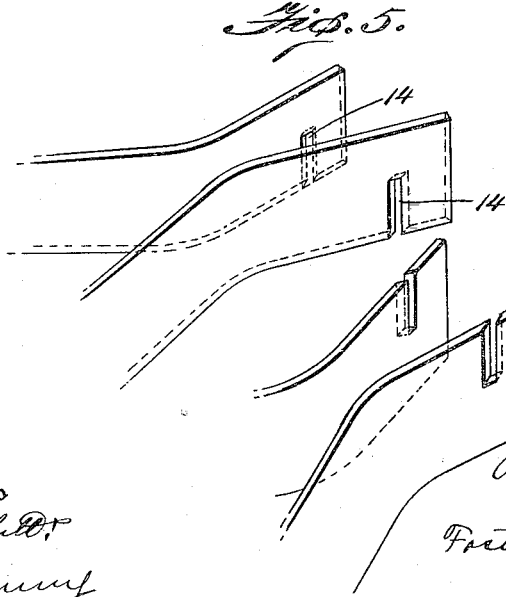
Witnesses
Inventor
Augusta V. Mitchell
By Foster, Freeman, Watson & Coit
Attorneys

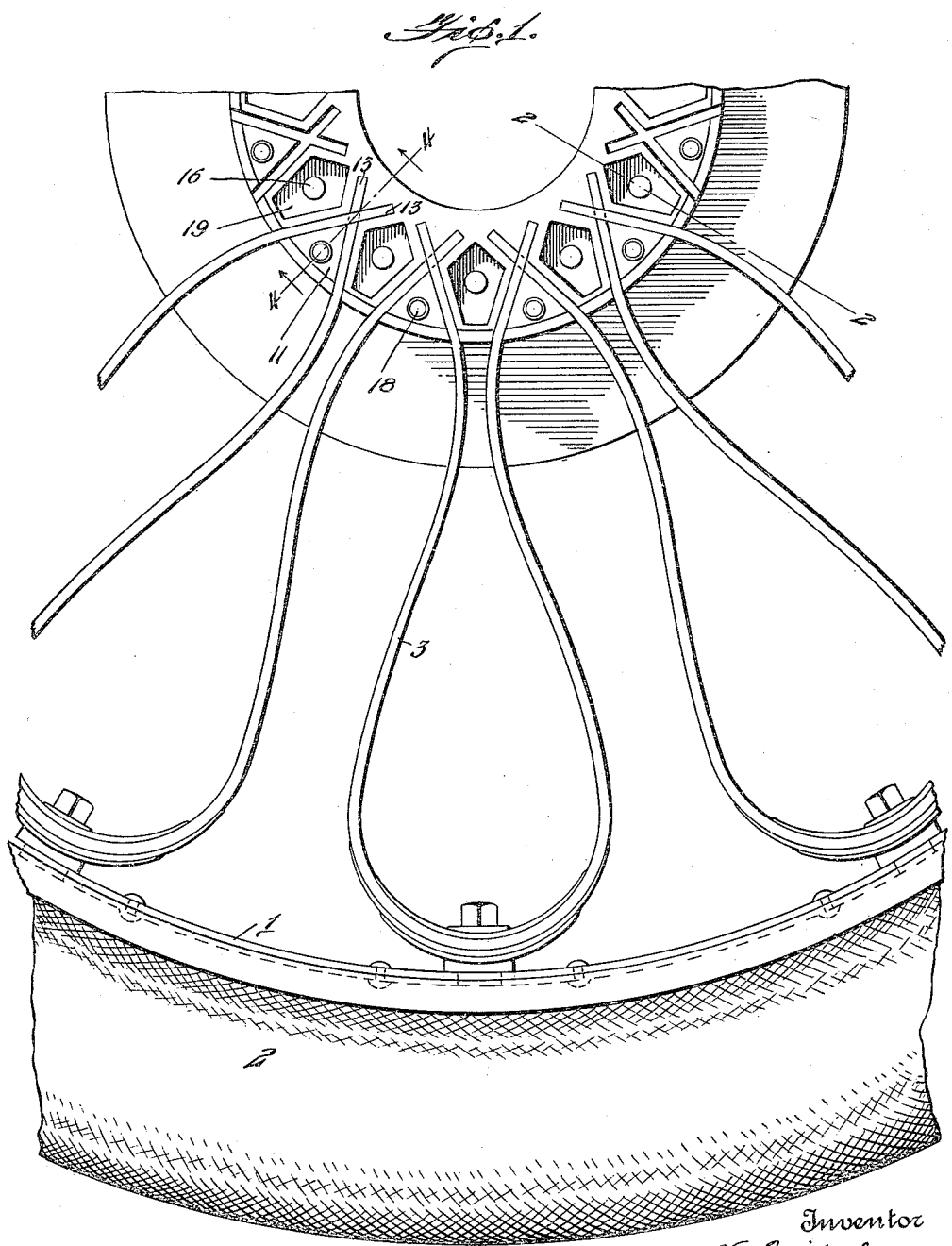

UNITED STATES PATENT OFFICE.

AUGUSTA V. MITCHELL, OF WASHINGTON, DISTRICT OF COLUMBIA.

SPRING-WHEEL CONSTRUCTION.

1,127,271.

Specification of Letters Patent.

Patented Feb. 2, 1915.

Application filed October 17, 1913. Serial No. 795,736.

*To all whom it may concern:*

Be it known that I, AUGUSTA V. MITCHELL, a citizen of the United States, and resident of Washington, District of Columbia, have invented certain new and useful Improvements in Spring-Wheel Constructions, of which the following is a specification.

This invention relates to spring wheels and has particular reference to the means for securing the spring spokes to the hub and to the felly.

It has been my object to make a construction which will possess the necessary strength and rigidity and which will at the same time be capable of being assembled and taken apart easily.

The novel features of the invention will be apparent from the following description, taken in connection with the accompanying drawings.

In the drawings Figure 1 is a side view of a portion of a wheel showing my invention; Fig. 2 is a section through the wheel hub on the line corresponding to the line 2—2 in Fig. 1; Fig. 3 is a section on the line 4—4 of Fig. 1; Fig. 4 is a longitudinal section through the end of the spoke and a portion of the felly; and Fig. 5 is a perspective view of the ends of two adjacent spokes.

In the drawings, I have shown a wheel felly 1 on which is mounted a rubber tire 2 and a series of spring spokes are secured at intervals to the inner face of the felly. Each spring spoke 3 is made from a single strip of flat resilient metal bent symmetrically upon itself in the form of a loop, the end of the loop being out next to the felly and there being a reverse curve near the free ends whereby those ends will diverge slightly at an angle at the hub. The center of the loop rests on a seat 4 which has its bearing face curved to correspond to the curvature of the spoke at that point except at the outer edges or corners 5 which are cut away or curved slightly in an outward direction so as to leave no sharp edge but to furnish a rounded bearing surface. The member 4 constituting the seat is screw-threaded into the felly as shown in Fig. 4 and a bolt 6 passes through the spoke and is screw-threaded into the bearing so as to firmly hold the spoke in place. I preferably place a retaining member 7 between the head of the bolt and the spring spoke, the surface of this retaining member being curved to correspond with the curvature of the spoke. I also preferably place on the inner and outer faces of the spoke at the end of the loop, leaf springs 8 and 9 which have a curvature corresponding to the curvature of the spoke and which taper out to their ends. When these leaf springs are used the bolt 6 passes through them as well as the spokes. These leaf springs serve to strengthen the spoke and to distribute the strain at the end next to the felly where there would be the greatest probability of breakage. The leaf springs are placed on both sides because it will be observed that in this type of spoke there is at certain times a compression which tends to spread the side members of the spoke against the spring action of the leaf springs 9, whereas at other times there is a pull on the side members which tends to bring them together which will be resisted by the leaf spring 8.

It will be observed that the bearing 4 is bodily removed from the felly by simply unscrewing it and that it carries the bolt 6. One advantage of this removable bearing is that if the bolt should at any time be broken rendering it difficult or impossible to unscrew it the entire bearing can be removed and another one substituted. This would not be possible if the bolt were screwed directly into the felly.

The hub of the wheel is made in three sections and may be made of metal or any suitable material. It embodies a plate 10 which as shown is circular in form having integral therewith the projections 11 in the arc of a circle around the margin, those projections having a height equal to the width of the spring spoke 3. These projections are V-shaped in cross-section on a plane parallel to the plate 10 and the point of the V is toward the center of the circle. A member 12 having the same thickness as the width of the spokes has V-shaped openings cut around its periphery corresponding to the projections 11, the said openings being just so much larger than the projections 11 as to leave between the projections and the member 12 grooves or openings just wide enough to receive the flat metal ends of the spokes 3. Grooves or slots 13 are also formed in the member 12 continuing beyond the point of the V and in line with the sides thereof so as to form continuations of the grooves between the projections 11 and the member 12. It will be observed that these grooves cross each other as shown. The two ends of each spring spoke have notches 14 cut in their edges and extending half way through them. The end of one spoke fitting in one of the grooves enters the notch formed in the end of the adjacent spoke fitting in the other crossing groove. The notches in one spoke will be on the outer side and on the next spoke will be on the inner side so that they will properly fit together as shown in Fig. 5. Since, however, all of the spokes are exactly alike they will in assembling be so turned that alternating spokes face in the opposite direction. The construction by which the notched spokes cross each other will interlock them and hold them rigidly in place. The plate 15 fits over the ends of the projections 11 and over the member 12 and bolts 16 are passed through it and through the plate 10 so as to secure the parts together, clamping the ends of the springs 3 in their grooves. The fit between the ends of the springs and these side plates may be made such as to securely clamp them and prevent any looseness or rattling. The plate 15 preferably has around its outer margin a rib 17, the inner face of which is cut on an angle engaging an outer similarly cut edge of the projections 11 and of the member 12, so as to properly center the plate and the parts. Pins or projections 18 may also be placed on the upper ends of the projections 11 and these pins may be tapered outwardly entering sockets in the plate 15. In order to save in weight and material, openings 19 may be left in the member 12 and the bolts 16 will pass through these openings.

It will be observed that the integral projections 11 on the edge of the plate 10 makes the construction at the hub very strong and rigid, and when the plate 15 is in place the spring spokes are held without any possibility of becoming loose, being interlocked with each other. The construction is however at the same time such that if any spoke should be broken or defective it may be easily removed. If it should be one of the spokes having the notches 14 on its inner edge the spoke can be easily removed and lifted out of the notches on removal of the plate 15, and if the spoke which it is desired to remove is one of those having notches on its outer edge, it can be removed by first removing the two adjacent spokes.

Having thus described my invention, what I claim is:

1. In a device of the class described, the combination with a wheel felly, of a spring spoke having two symmetrical curved legs meeting at the felly, curved leaf springs on the inner and outer faces of said spoke at the felly, a member constituting a seat for said springs screw-threaded into said felly and provided with a screw-threaded opening, and a bolt passing through said spoke and springs and engaging said screw-threaded opening in said member to secure the spoke in place.

2. In a device of the class described, the combination with a wheel felly, of a spring spoke having two symmetrical curved legs meeting at the felly, a seat for said spoke screw-threaded into said felly and having its inner face curved to correspond with the curvature of said spoke and provided with a screw-threaded opening, a retaining member for said spoke fitting against the inner face of said spoke in line with said seat, and a bolt passing through said member and spoke and into said seat.

3. In a device of the class described, the combination with a wheel felly, of a spring spoke having two symmetrical curved legs meeting at the felly, a seat for said spoke screw-threaded into said rim and having its inner face curved to correspond with the curvature of said spoke except at the edges which have a reverse curve and provided with a screw-threaded opening, a retaining member for said spoke fitting against the inner face of said spoke in line with said seat, and a bolt passing through said member and spoke and into said seat.

4. In a device of the class described, the combination with a wheel hub having sockets therein in pairs crossing each other at an angle, each socket being adapted to receive one end of a flat metal spoke, of flat metal spring spokes having their ends fitting in said sockets, the said ends being notched at the point where they cross so as to interlock against end movement.

5. In a device of the class described, the combination with a wheel hub having sockets therein in pairs crossing each other at an angle, each socket being adapted to receive one end of a flat metal spoke, of flat metal spring spokes each made symmetrical and in one piece with its ends fitting in sockets in two adjacent pairs and crossing the ends of adjacent spokes, the said ends being notched to interlock where they cross.

6. In a device of the class described, the combination with a wheel hub having sockets therein in pairs crossing each other at an angle, each socket being adapted to receive one end of a flat metal spoke, of flat metal spring spokes each made symmetrical and in one piece with its ends fitting in sockets in two adjacent pairs and crossing the ends of adjacent spokes, the said ends being notched to interlock where they cross, the notches on both ends of any single spoke being on the same edge whereby the ends of one spoke will fit over the ends of the two adjacent spokes where they cross.

7. In a wheel hub adapted to receive spring spokes, the combination with a plate having projections on one face at regular intervals in the arc of a circle, the said projections being V-shaped in a section parallel to the plate, of a circular member having V-shaped notches fitting around but separated from said projections so as to have sockets adapted to receive the ends of flat spokes, the said member having similar sockets in line with and extending beyond the ends of said V, and a plate fitting over said member and against the ends of said projections.

8. In a wheel hub adapted to receive spring spokes, the combination with a plate having projections on one face at regular intervals in the arc of a circle, the said projections being V-shaped in a section parallel to the plate, of a circular member having V-shaped notches fitting around but separated from said projections so as to have sockets adapted to receive the ends of flat spokes, the said member having similar sockets in line with and extending beyond the ends of said V, and a plate fitting over said member and against the ends of said projections, means on said last mentioned plate member and projections for interlocking and centering the parts and bolts passing through the two plates for securing the parts together.

In testimony whereof I affix my signature in presence of two witnesses.

AUGUSTA V. MITCHELL.

Witnesses:
ARTHUR L. BRYANT,
JOHN M. COIT.

Copies of this patent may be obtained for five cents each, by addressing the "Commissioner of Patents, Washington, D. C."